Nov. 6, 1956   B. A. SERFLING ET AL   2,769,351
ADJUSTABLE STEERING POST
Filed June 13, 1955
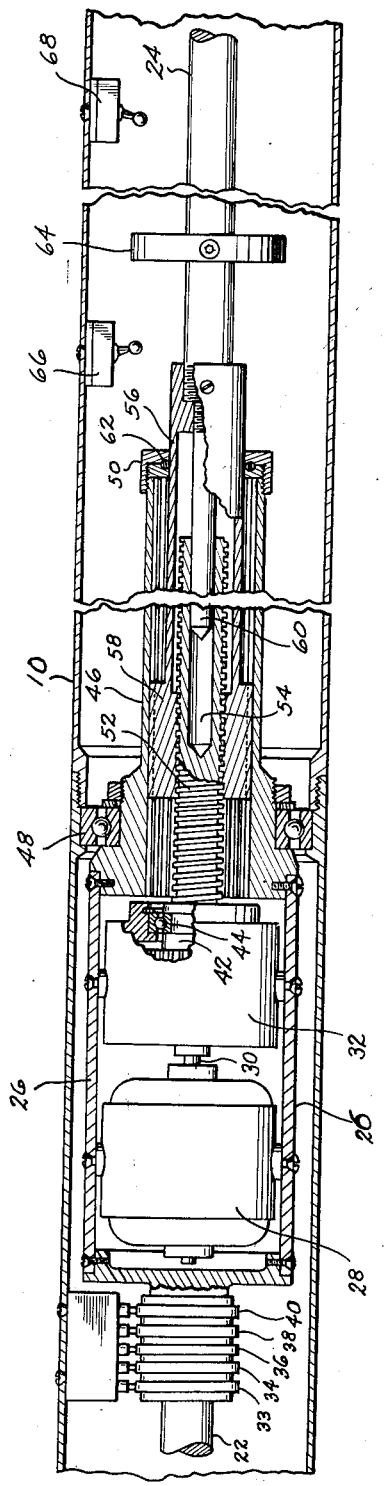
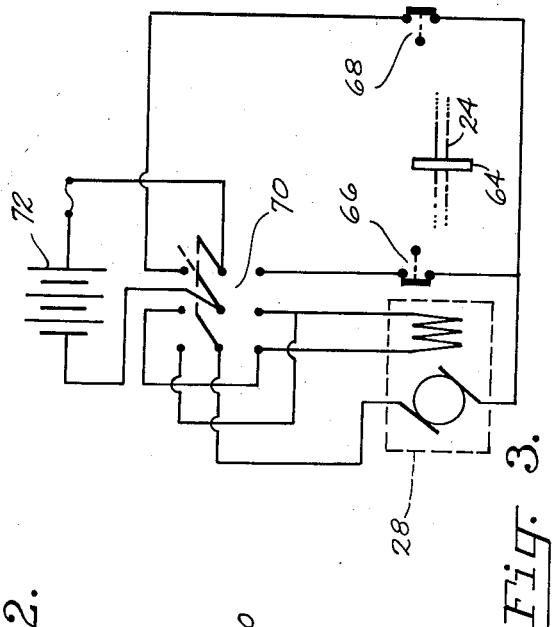
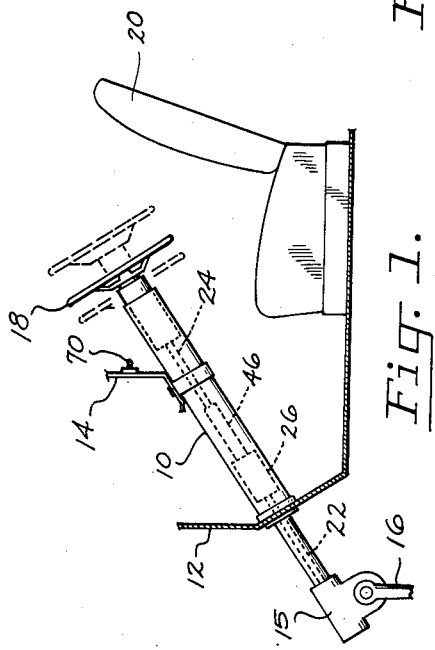
INVENTORS
Byron A. Serfling
BY Omer K. McCaleb
Eugene D. Farley
Atty.

United States Patent Office 2,769,351
Patented Nov. 6, 1956

2,769,351

ADJUSTABLE STEERING POST

Byron A. Serfling, Gardiner, and Omer K. McCaleb, Portland, Oreg.

Application June 13, 1955, Serial No. 515,001

3 Claims. (Cl. 74—493)

This invention relates to adjustable steering posts for vehicles. It pertains particularly to automobile steering posts which are longitudinally extendable and retractable.

It is the general object of the present invention to provide a steering post for automobiles and other vehicles which is adjustable longitudinally to correspond to the height of the vehicle operator.

It is another object of this invention to provide a steering post for vehicles which increases the safety with which a vehicle may be operated since it enables the operator to grasp the steering wheel of the vehicle more comfortably and securely.

It is another of object of this invention to provide a steering post for vehicles which is adjustable longitudinally without interfering with the steering action of the post.

It is another object of this invention to provide a steering post for vehicles which permits a substantially greater degree of adjustment of the front seat position of the vehicle.

It is another object of this invention to provide a steering post for vehicles which is self-locking in the selected position.

It is another object of this invention to provide a steering post for vehicles which permits easier loading and unloading of the rear seat of two door automobiles.

It is another object of this invention to provide a steering post for vehicles which is versatile and can be applied to the steering posts of all of the conventional types of automobiles and trucks irrespective of whether they are provided with power steering or with a gear shift mechanism on the steering column.

The manner in which the foregoing and other objects of this invention are accomplished will be apparent from the accompanying specification and claims considered together with the drawings, wherein:

Fig. 1 is a view in elevation of the herein described steering post mounted in the driver's compartment of an automobile;

Fig. 2 is a detail sectional view showing the construction of the steering post illsutrated in Fig. 1; and Fig. 3 is a wiring diagram illustrating an electrical circuit which may be employed in actuating the adjustable steering post of Fig. 1.

Generally stated the herein described adjustable steering post comprises a lower post section, means for attaching the lower post section to the steering apparatus of the vehicle, an upper post section to which the steering wheel is attached, and means for adjustably connecting the upper and lower post sections, the adjustment being made longitudinally thereof. Power means are provided for driving one of the post sections relative to the other. Also, appropriate limiting means are present for arresting the motion of the post section when it has reached the desired station and for locking it in that station.

Considering the foregoing in greater detail and with particular reference to the drawings:

As will be apparent from Fig. 1, the adjustable steering post of this invention may be installed in the usual location in an automobile or other vehicle. Thus post assembly 10 may be mounted in the driver's compartment where it penetrates fire wall 12 and is attached to dashboard 14. Its lower end is connected in the conventional manner to gear box 15 and thence through pitman arm 16 to the front wheels of the vehicle. The steering post carries a steering wheel 18, which, in accordance with the present invetnion, is adjustable between various positions as required by the height of the operator seated in seat 20. The latter also may be of conventional construction and may be mounted on a track for moving it forwardly or rearwardly in the usual manner.

Referring now more particularly to Fig. 2 it will be seen that the steering post assembly includes a lower post section 22 and an upper post section 24. These are in susbtantial axial alignment with each other and are interconnected through means for adjusting them longitudinally with respect to each other.

The adjusting means employed is motor driven. Accordingly the lower section 22 has rigid to its upper end a housing 26 within which is mounted a reversible electric motor 28, the shaft 30 of which is connected to a gear reducer 32. Electrical connections 33—40 are provided for actuating the motor in the desired direction.

Gear reducer 32 contains an enlarged drive shaft 42 mounted for rotation in thrust bearing 44. Housing 26 has connected to its outer end a co-axial, hollow sleeve 46 mounted for rotation in bearings 48. The interior of sleeve 46 is formed with a plurality of spaced grooves and its outer end is provided with a cap piece 50.

Screw means or other suitable means are included in the assembly for extending and retracting steering post sections 22, 24 relative to each other. To this end there is provided a screw 52 which is rigid to and extends outwardly from shaft 42 and which penetrates sleeve 46. The outer end of the screw is formed with an internal recess or bore 54.

Operating within sleeve 46 is a second sleeve 56, rigid to and co-axial with upper steering post section 24. This sleeve carries at its outer end an enlarged spline section 58, the splines of which are dimensioned for reception in the longitudinal grooves of the interior of sleeve 46. The inner surface of section 58 of sleeve 56 is threaded for the reception of screw 52.

A stabilizing rod 60 is also affixed to the end of post section 24. This rod is dimensioned to be received in recess 54 in the screw, where it serves a stabilizing function. Bearings 62 are provided between sleeves 46 and 56 to insure their free movement relative to each other. In this manner there is provided an assembly for securing the extension and retraction of the two steering post sections relative to each other while retaining the required degree of stability for safe, accurate steering of the vehicle.

Control means also are provided for controlling the movement of the post sections relative to each other. In the illustrated form the control means operate electrically, although other types of control means may be employed if desired. Accordingly a contact member or striker 64 is affixed to the steering post section 24 intermediate between a pair of limit switches 66, 68. These are included in an electric circuit with a double throw three pole switch 70 which is spring loaded to its center or off position. A suitable circuit is illustrated in Fig. 3. Switch 70 may be located in a position convenient to the operator on the dashboard of the vehicle.

Operation

When the operator of the vehicle wishes to adjust the position of the steering wheel relative to the driver's seat, he closes switch 70 in one direction or the other depending upon whether he wishes to raise or lower the steering wheel. This energizes reversible motor 28 which accordingly runs in a clockwise or counterclockwise direction. This drives screw 52 correspondingly, which in turn drives the splined sleeve 56 up or down within sleeve 46, the resulting thrust being borne by thrust bearings 44, 48, 62, and the assembly being stabilized by stabilizing rod 60.

Longitudinal movement of the steering wheel continues until pressure on switch 70 is released. Thereupon the switch automatically returns to its off position, interrupting the circuit and shutting off motor 28. However, if the switch is left closed inadvertently or otherwise for too long a period of time, contact member 64 will engage one or the other of limit switches 66, 68. This will open the limit switch, interrupting the circuit and shutting off the motor. In either case the steering wheel remains fixed in position until motor 28 is energized again.

Thus it will be apparent by the present invention we have provided an adjustable steering post assembly by means of which the position of the steering wheel of a vehicle may be adjusted with respect to the position of the driver's seat as required to meet the needs of drivers of various height. Any degree of adjustment within predetermined limits may be obtained. The adjustment is made smoothly and safely and can not interfere with the normal operation of the steering apparatus. It may be made, furthermore, easily, without effort, and irrespective of whether the vehicle is provided with power steering or with a gear shift lever on the steering post.

It is to be understood that the form of our invention herewith shown and described, is to be taken as a preferred example of the same, and that various changes in the shape, size and arrangement of parts may be restorted to, without departing from the spirit of our invention or the scope of the subjoined claims.

Having thus described our invention, we claim:

1. An adjustable steering post assembly for vehicles which comprises a first steering post section, a second steering post section substantially co-axial with the first steering post section, a hollow first sleeve extending outwardly from one of the steering post sections co-axial therewith, a motor secured to and contained within the first sleeve, screw means connected to and driven by the motor, a second sleeve attached to the other steering post section and co-axial therewith, the second sleeve being splined within the first sleeve and receiving the screw means in threaded engagement, mounting means for mounting the steering post sections and sleeves on the vehicle for longitudinal movement upon actuation of the screw means, and motor control means positioned remotely from the motor for controlling the operation of the latter.

2. An adjustable steering post assembly for vehicles which comprises a first steering post section, a second steering post section substantially co-axial with the first steering post section, telescoping means interconnecting the steering post sections and having a hollow portion, mounting means for mounting the post sections on the vehicle for longitudinal movement with respect to each other, a motor secured within the hollow portion of the telescoping means connected to one of the post sections, a screw driven by the motor and threaded into the other of said post sections, and motor control means positioned remotely from the motor for controlling the operation of the latter.

3. An adjustable steering post assembly for vehicles which comprises a first steering post section, a second steering post section substantially co-axial with the first steering post section, a first sleeve extending outwardly from one of the steering post sections co-axial therewith, a reversible electric motor mounted on the first sleeve, screw means connected to and driven by the motor, a second sleeve attached to the other steering post section and co-axial therewith, the second sleeve being splined within the first sleeve and receiving the screw means in threaded engagement, mounting means for mounting the steering post sections and sleeves on the vehicle for longitudinal movement upon actuation of the screw means, switch means for energizing the motor in forward and reverse directions and for deenergizing it when the steering post has reached a selected position, limit switches for deenergizing the motor upon adjustment of the steering post through predetermined extreme limits, and an electric circuit including the switch, the reversible electric motor and the limit switches.

References Cited in the file of this patent

UNITED STATES PATENTS

| | | |
|---|---|---|
| 1,795,567 | Maurice | Mar. 10, 1931 |
| 2,074,334 | Hughes | Mar. 23, 1937 |
| 2,464,856 | Finley | Mar. 22, 1949 |